United States Patent
Zhamu et al.

(10) Patent No.: US 9,773,622 B2
(45) Date of Patent: Sep. 26, 2017

(54) POROUS PARTICLES OF INTERCONNECTED 3D GRAPHENE AS A SUPERCAPACITOR ELECTRODE ACTIVE MATERIAL AND PRODUCTION PROCESS

(71) Applicants: Aruna Zhamu, Springboro, OH (US); Bor Z Jang, Centerville, OH (US)

(72) Inventors: Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 62 days.

(21) Appl. No.: 14/756,315

(22) Filed: Aug. 26, 2015

(65) Prior Publication Data

US 2017/0062141 A1  Mar. 2, 2017

(51) Int. Cl.

| | | |
|---|---|---|
| *H01G 11/42* | (2013.01) | |
| *H01G 11/26* | (2013.01) | |
| *H01G 11/34* | (2013.01) | |
| *H01G 11/36* | (2013.01) | |
| *H01G 11/52* | (2013.01) | |
| *H01G 11/56* | (2013.01) | |
| *H01G 11/60* | (2013.01) | |
| *H01G 11/86* | (2013.01) | |
| *H01G 11/24* | (2013.01) | |
| *H01G 11/28* | (2013.01) | |
| *H01G 11/44* | (2013.01) | |
| *C01B 31/04* | (2006.01) | |
| *H01G 11/46* | (2013.01) | |
| *H01G 11/48* | (2013.01) | |

(52) U.S. Cl.
CPC .......... *H01G 11/42* (2013.01); *C01B 31/043* (2013.01); *C01B 31/0469* (2013.01); *H01G 11/24* (2013.01); *H01G 11/26* (2013.01); *H01G 11/28* (2013.01); *H01G 11/34* (2013.01); *H01G 11/36* (2013.01); *H01G 11/44* (2013.01); *H01G 11/52* (2013.01); *H01G 11/56* (2013.01); *H01G 11/60* (2013.01); *H01G 11/86* (2013.01); *H01G 11/46* (2013.01); *H01G 11/48* (2013.01); *Y02E 60/13* (2013.01)

(58) Field of Classification Search
CPC ........ H01G 11/42; H01G 11/26; H01G 11/34; H01G 11/36; H01G 11/22; H01G 11/24; H01G 11/28; H01G 11/86; H01G 11/30; H01G 11/32; H01G 11/84
See application file for complete search history.

(56) References Cited

U.S. PATENT DOCUMENTS

| | | | |
|---|---|---|---|
| 6,294,292 B1 * | 9/2001 | Tsushima | H01M 4/364 |
| | | | 429/162 |
| 7,071,258 B1 | 7/2006 | Jang et al. | |
| 7,579,112 B2 * | 8/2009 | Chiang | G02F 1/1523 |
| | | | 204/288 |
| 8,883,114 B2 | 11/2014 | Zhamu et al. | |
| 2006/0098389 A1 | 5/2006 | Liu et al. | |
| 2009/0059474 A1 | 3/2009 | Zhamu et al. | |
| 2009/0061312 A1 | 3/2009 | Zhamu et al. | |
| 2009/0092747 A1 | 4/2009 | Zhamu et al. | |
| 2010/0021819 A1 | 1/2010 | Zhamu et al. | |
| 2012/0026643 A1 | 2/2012 | Yu et al. | |
| 2013/0052538 A1 | 2/2013 | Pasta et al. | |
| 2013/0319870 A1 | 12/2013 | Chen et al. | |
| 2015/0048556 A1 * | 2/2015 | Moon | B01J 21/18 |
| | | | 264/425 |
| 2017/0036915 A1 * | 2/2017 | Worsley | C01B 31/0446 |

OTHER PUBLICATIONS

Banciu et al. "Chemical Activation of Mesocarbon Microbeads", Optoelectronics and Advanced Materials—Rapid Communications, vol. 4, No. 11., Nov. 2010, pp. 1717-1720.*
Lei et al. "Porous mesocarbon microbeads with graphitic shells: constructing a high-rate, high-capacity cathode for hybrid supercapacitor", Scientific Reports, 3:2477, Aug. 21, 2013, pp. 1-6.*
Lee et al. "Chemical Vapor Deposition of Mesoporous Graphene Nanoballs for Supercapacitor", ACS Nano, vol. 7, No. 7, Jun. 20, 2013, pp. 6047-6055.*
Chen, Z. et al. "Three-dimensional flexible and conductive interconnected graphene networks grown by chemical vapor deposition," Nat. Mater. 10, 424-428 (2011).
Yuxi Xu, Kaixuan Sheng, Chun Li, and Gaoquan Shi, "Self-Assembled Graphene Hydrogel via a One-Step Hydrothermal Process," ACS Nano, vol. 4, No. 7, 4324-4330 (2010).
International Search Report, PCT/US16/48961, dated Nov. 10, 2016.

* cited by examiner

*Primary Examiner* — Scott B Geyer (57) ABSTRACT

A process for producing a supercapacitor electrode, comprising (a) subjecting multiple particles of MCMBs to a chemical activation with an activating agent selected from an acid, a base, or a salt at a temperature from 100° C. to 1,200° C. for a period of 0.5 to 24 hours sufficient to produce multiple porous particles each of a monolithic 3D graphene structure comprising multiple pores and a continuous 3D network of graphene pore walls comprising continuous or naturally interconnected graphene ligaments of 1-20 graphene planes of carbon atoms; (b) producing a suspension containing these multiple porous particles, an optional conductive additive, and an optional resin binder in a liquid medium; and (c) depositing the suspension onto at least a primary surface of a current collector to form a wet layer and removing liquid medium from the wet layer to form the supercapacitor electrode.

29 Claims, 5 Drawing Sheets

FIG. 5

POROUS PARTICLES OF INTERCONNECTED 3D GRAPHENE AS A SUPERCAPACITOR ELECTRODE ACTIVE MATERIAL AND PRODUCTION PROCESS

FIELD OF THE INVENTION

The present invention relates generally to the field of supercapacitors or ultracapacitors, and more particularly to porous particles of continuous 3D graphene ligaments as an electrode active material in a supercapacitor.

BACKGROUND OF THE INVENTION

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but supercapacitors (with their ability to release energy much more quickly than batteries) would kick in whenever the car needs to accelerate for merging, passing, emergency maneuvers, and hill climbing. The EC must also store sufficient energy to provide an acceptable driving range. To be cost-, volume-, and weight-effective compared to additional battery capacity they must combine adequate energy densities (volumetric and gravimetric) and power densities with long cycle life, and meet cost targets as well.

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance of an EC relative to conventional capacitors (10 to 100 times higher) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation." Such a supercapacitor is commonly referred to as an electric double layer capacitor (EDLC). The double layer capacitor is based on a high surface area electrode material, such as activated carbon, immersed in a liquid electrolyte. A polarized double layer is formed at electrode-electrolyte interfaces providing high capacitance. This implies that the specific capacitance of a supercapacitor is directly proportional to the specific surface area of the electrode material. This surface area must be accessible by electrolyte and the resulting interfacial zones must be sufficiently large to accommodate the so-called electric double-layer charges.

In some ECs, stored energy is further augmented by pseudo-capacitance effects, occurring again at the solid-electrolyte interface due to electrochemical phenomena such as the redox charge transfer.

However, there are several serious technical issues associated with current state-of-the-art ECs or supercapacitors:

(1) Experience with ECs based on activated carbon electrodes shows that the experimentally measured capacitance is always much lower than the geometrical capacitance calculated from the measured surface area and the width of the dipole layer. For very high surface area carbons, typically only about 20 percent of the "theoretical" capacitance was observed. This disappointing performance is related to the presence of micro-pores (<2 nm, mostly <1 nm) and ascribed to inaccessibility of some pores by the electrolyte, wetting deficiencies, and/or the inability of a double layer to form successfully in pores in which the oppositely charged surfaces are less than about 1-2 nm apart. In activated carbons, depending on the source of the carbon and the heat treatment temperature, a surprising amount of surfaces (40-80%) can be in the form of such micro-pores.

(2) Despite the frequently claimed high gravimetric capacitances at the electrode level (based on the active material weight alone) as reported in open literature and patent documents, these electrodes unfortunately fail to provide energy storage devices with high capacities at the supercapacitor cell or pack level (based on the total cell weight or pack weight). This is due to the notion that, in these reports, the actual mass loadings of the electrodes and the apparent densities for the active materials are too low. In most cases, the active material mass loadings of the electrodes is significantly lower than 10 mg/cm$^2$ (area density=the amount of active materials per electrode cross-sectional area along the electrode thickness direction) and the apparent volume density or tap density of the active material is typically less than 0.75 g/cm$^3$ (more typically less than 0.5 g/cm$^3$ and most typically less than 0.3 g/cm$^3$) even for relatively large particles of activated carbon.

The low mass loading is primarily due to the inability to obtain thicker electrodes (thicker than 100-200 μm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. These problems are particularly acute for graphene material-based electrodes. It has not been previously possible to produce graphene-based electrodes that are thicker than 50-100 μm and remain highly porous with pores remaining fully accessible to liquid electrolyte. The low areal densities and low volume densities (related to thin electrodes and poor packing density) result in a relatively low volumetric capacitance and low volumetric energy density of the supercapacitor cell.

With the growing demand for more compact and portable energy storage systems, there is keen interest to increase the utilization of the volume of the energy storage devices. Novel electrode materials and designs that enable high volumetric capacitances and high mass loadings are essential to achieving improved cell volumetric capacitances and energy densities.

(3) During the past decade, much work has been conducted to develop electrode materials with increased volumetric capacitances utilizing porous carbon-based materials, such as graphene, carbon nanotube-based composites, porous graphite oxide, and porous meso carbon. Although these experimental supercapacitors featuring such electrode materials can be charged and discharged at high rates and also exhibit large volumetric electrode capacitances (100 to 200 F/cm$^3$ in most cases, based on the electrode volume), their typical active mass loading of <5 mg/cm$^2$, tap density of <0.2 g/cm$^3$, and electrode thicknesses of up to tens of micrometers are still significantly lower than those used in most commercially available electrochemical capacitors (i.e. 10 mg/cm$^2$, 100-200 μm), which results in energy storage devices with relatively low areal and volumetric capacitances and low volumetric energy densities.

(4) For graphene-based supercapacitors, there are additional problems that remain to be solved, explained below:

Nano graphene materials have recently been found to exhibit exceptionally high thermal conductivity, high electrical conductivity, and high strength. Another outstanding characteristic of graphene is its exceptionally high specific surface area. A single graphene sheet provides a specific external surface area of approximately 2,675 m$^2$/g (that is accessible by liquid electrolyte), as opposed to the exterior surface area of approximately 1,300 m$^2$/g provided by a corresponding single-wall CNT (interior surface not accessible by electrolyte). The electrical conductivity of graphene is slightly higher than that of CNTs.

The instant applicants (A. Zhamu and B. Z. Jang) and their colleagues were the first to investigate graphene- and other nano graphite-based nano materials for supercapacitor application [Please see Refs. 1-5 below; the 1$^{st}$ patent application was submitted in 2006 and issued in 2009]. After 2008, researchers began to realize the significance of nano graphene materials for supercapacitor applications.

LIST OF REFERENCES

1. Lulu Song, A. Zhamu, Jiusheng Guo, and B. Z. Jang "Nano-scaled Graphene Plate Nanocomposites for Supercapacitor Electrodes" U.S. Pat. No. 7,623,340 (Nov. 24, 2009).
2. Aruna Zhamu and Bor Z. Jang, "Process for Producing Nano-scaled Graphene Platelet Nanocomposite Electrodes for Supercapacitors," U.S. patent application Ser. No. 11/906,786 (Oct. 4, 2007).
3. Aruna Zhamu and Bor Z. Jang, "Graphite-Carbon Composite Electrodes for Supercapacitors" U.S. patent application Ser. No. 11/895,657 (Aug. 27, 2007).
4. Aruna Zhamu and Bor Z. Jang, "Method of Producing Graphite-Carbon Composite Electrodes for Supercapacitors" U.S. patent application Ser. No. 11/895,588 (Aug. 27, 2007).
5. Aruna Zhamu and Bor Z. Jang, "Graphene Nanocomposites for Electrochemical cell Electrodes," U.S. patent application Ser. No. 12/220,651 (Jul. 28, 2008).
6. Chen, Z. et al. Three-dimensional flexible and conductive interconnected graphene networks grown by chemical vapour deposition. Nat. Mater. 10, 424-428 (2011).
7. Yuxi Xu, Kaixuan Sheng, Chun Li, and Gaoquan Shi, "Self-Assembled Graphene Hydrogel via a One-Step Hydrothermal Process," ACS Nano, Vol. 4, No. 7, 4324-4330 (2010).
8. Aruna Zhamu, Jiusheng Guo, and Bor Z. Jang, "Production of Ultra-thin Nano-Scaled Graphene Platelets from Meso-Carbon Micro-Beads," U.S. patent application Ser. No. 12/005,015 (Dec. 26, 2007); now U.S. Pat. No. 8,883,114 (Nov. 11, 2014).

However, individual nano graphene sheets have a great tendency to re-stack themselves, effectively reducing the specific surface areas that are accessible by the electrolyte in a supercapacitor electrode. The significance of this graphene sheet overlap issue may be illustrated as follows: For a nano graphene platelet with dimensions of l (length)×w (width)×t (thickness) and density ρ, the estimated surface area per unit mass is S/m=(2/ρ) (1/l+1/w+1/t). With ρ≅2.2 g/cm$^3$, l=100 nm, w=100 nm, and t=0.34 nm (single layer), we have an impressive S/m value of 2,675 m$^2$/g, which is much greater than that of most commercially available carbon black or activated carbon materials used in the state-of-the-art supercapacitor. If two single-layer graphene sheets stack to form a double-layer graphene, the specific surface area is reduced to 1,345 m$^2$/g. For a three-layer graphene, t=1 nm, we have S/m=906 m$^2$/g. If more layers are stacked together, the specific surface area would be further significantly reduced.

These calculations suggest that it is critically important to find a way to prevent individual graphene sheets to re-stack and, even if they partially re-stack, the resulting multi-layer structure would still have inter-layer pores of adequate sizes. These pores must be sufficiently large to allow for accessibility by the electrolyte and to enable the formation of electric double-layer charges, which typically require a pore size of at least 1 nm, more preferably at least 2 nm. However, these pores or inter-graphene spacings must also be sufficiently small to ensure a large tap density. Unfortunately, the typical tap density of graphene-based electrodes made by using the conventional slurry coating and drying is less than 0.3 g/cm$^3$, and most typically <<0.1 g/cm$^3$. To a great extent, the requirement to have large pore sizes and high porosity level and the requirement to have a high tap density are considered mutually exclusive in supercapacitors.

Another major technical barrier to using graphene sheets as a supercapacitor electrode active material is the challenge of depositing a thick active material layer onto the surface of a solid current collector (e.g. Al foil) using the conventional graphene-solvent slurry coating procedure. In such an electrode, the graphene electrode typically requires a large amount of a binder resin (hence, significantly reduced active material proportion relative to the non-active or overhead materials/components). In addition, any electrode prepared in this manner that is thicker than 50 μm is brittle and weak. There has been no effective solution to these problems.

Presumably, one could use a different approach to fabricating graphene-based supercapacitor electrodes; e.g. chemical vapor deposition (CVD) catalyzed by Ni foam (Ref. 6). A thin-layer structure (up to 3 graphene planes) is deposited on the surfaces of a Ni foam. The supporting Ni foam is then chemically etched away, leaving behind a highly fragile 3D interconnected graphene foam. Even when reinforced by a resin, CVD graphene foam is very fragile. Furthermore, the pore sizes of graphene foam are too big (typically 1-100 μm), resulting in an excessively low density structure, typically <<0.05 g/cm$^3$. Due to the inherent Ni catalytic effect, the catalytic CVD process is incapable of producing pore walls that are thicker than 3 graphene planes.

Alternatively, one could generate graphene oxide (GO) or chemically modified graphene (CMG) sheets that are dispersed in a liquid medium (e.g. water) to form a suspension. The suspension is then subjected to a hydrothermal treatment to obtain a self-assembled graphene structure that is porous (Ref. 7). Unfortunately, GO- and CMG-derived graphene foams are not sufficiently conducting due to high defect populations caused by oxidation and other chemical modification reactions. Pristine graphene sheets can be made into a paper form, but the resulting paper layer is not sufficiently conducting even though individual, separate pristine graphene sheets are relatively defect-free and more conducting as compared to GO or CMG sheets. Paper-making also tends to result in re-stacking of graphene sheets.

The most serious problem associated with the CVD, self-assembly, and paper-making processes is the notion that they are not compatible with the existing supercapacitor manufacturing processes, equipment, and facilities. Furthermore, CVD processes are slow and expensive. It is also an expensive, complex, and tedious process to chemically oxidize and intercalate graphite particles, exfoliate the resulting oxidized/intercalated graphite, mechanically break down the exfoliated graphite to produce isolated/separated GO sheets, and, finally, re-assemble these individual sheets to a porous structure. The chemical oxidation/intercalation process requires the use of undesirable chemicals, massive quantities of rinsing water, and post reaction waste water treatment; hence, this is not an environmentally sound process.

Therefore, there is a clear and urgent need for a supercapacitor electrode production process that is simple and fast, not energy intensive, more environmentally benign, requiring no chemical oxidation and exfoliation of graphite and separation of graphene sheets. The process must be compatible with existing supercapacitor manufacturing equipment and facilities. The resulting supercapacitors must also have a relatively high active material mass loading (high areal density), active materials with high apparent density (high tap density), high electrode thickness without significantly decreasing the electron transport rates (e.g. without a long electron transport distance), high volumetric capacitance, and high volumetric energy density. For graphene-based electrodes, one must also overcome problems such as re-stacking of graphene sheets, the demand for large proportion of a binder resin, and difficulty in producing thick graphene electrode layers.

SUMMARY OF THE INVENTION

The present invention provides a process for producing a supercapacitor electrode. In an embodiment, the process comprises (a) subjecting multiple particles of meso-carbon micro-beads, MCMBs, to a chemical activation with an activating agent selected from an acid, a base, or a salt at an activation temperature from 100° C. to 1,200° C. (preferably from 300° C. to 1,000° C.) for a period of 0.5 to 24 hours sufficient to produce multiple porous particles each of a monolithic 3D graphene structure comprising multiple pores having a pore size in the range of 1 nm and 50 nm (preferably in the range of 2 nm and 25 nm) and a continuous 3D network of graphene pore walls comprising continuous or naturally interconnected graphene ligaments of from 1 to 20 graphene planes of carbon atoms; (b) producing a suspension containing these multiple porous particles, an optional conductive additive, and an optional resin binder in a liquid medium; and (c) depositing the suspension onto at least a primary surface of a current collector to form a wet layer and removing the liquid medium from the wet layer to form the supercapacitor electrode.

Preferably, the graphene ligaments contain an amount of non-carbon elements so that the inter-graphene spacing is increased from an inter-graphene spacing of 0.336 nm (observed for MCMBs prior to chemical activation) to a range of from 0.337 nm to 0.65 nm.

In certain embodiments, the activating agent is selected from $H_3PO_4$, $H_2SO_4$, $ZnCl_2$, NaOH, KOH, $CaCl_2$, $CH_3CO_2K$ (potassium acetate), or a combination thereof. The chemical activation may be conducted in conjunction with physical activation. The chemical activation may be conducted before, during, and after a physical activation.

Preferably, the starting MCMB particles are spherical in shape and the resulting multiple porous particles are substantially spherical or ellipsoidal in shape.

In certain embodiments, the graphene ligaments in the porous particles are further deposited with a redox pair partner material selected from an organic or conducting polymer and/or a transition metal oxide. Preferably, the graphene ligaments are deposited with a redox pair partner material selected from $RuO_2$, $IrO_2$, NiO, $MnO_2$, $VO_x$, $TiO_2$, $Cr_2O_3$, $Co_2O_3$, $PbO_2$, $Ag_2O$, $MoC_x$, $Mo_2N$, $WC_x$, $WN_x$, a transition metal oxide, and combinations thereof. Alternatively or additionally, the graphene ligaments are further functionalized with one or more functional groups selected from the group consisting of $—SO_3$, $—R'COX$, $—R'(COOH)_2$, $—CN$, $—R'CH_2X$, $—OH$, $—R'CHO$, $—R'CN$, wherein R' is a hydrocarbon radical, and wherein X is $—NH_2$, $—OH$, or a halogen. Preferably, the graphene ligaments are further deposited with an intrinsically conductive polymer to form a redox pair for inducing pseudocapacitance.

The present invention also provides a supercapacitor comprising a first electrode, a second electrode, a porous separator disposed between the first and the second electrode, and an electrolyte in physical contact with the first and second electrodes, wherein at least one of the two electrodes is prepared by the process described above. In other words, the at least one electrode contains multiple porous particles each of a monolithic 3D graphene structure comprising multiple pores having a pore size in the range from 1 nm to 50 nm and a continuous 3D network of graphene pore walls comprising continuous or naturally interconnected graphene ligaments of 1 to 20 graphene planes of carbon atoms.

Each porous particle comprises a monolithic 3D graphene structure comprising multiple pores having a pore size preferably in the range of 2 nm and 25 nm and a continuous 3D network of naturally interconnected graphene ligaments of from 1 to 20 graphene planes of carbon atoms without using a binder. This continuous or naturally interconnected 3D network of graphene ligaments is not made from re-connecting previously separated graphene sheets, graphene oxide sheets, or chemically modified graphene sheets, or from chemical vapor deposition. Preferably, the multiple pores have a pore size in the range of 3 nm and 25 nm, more preferably in the range of 4 nm and 15 nm.

In a preferred embodiment, both of the first electrode and the second electrode of a supercapacitor are produced by the above-described process. The electrolyte used in the presently invented supercapacitor can be an aqueous liquid electrolyte, an organic liquid electrolyte, an ionic liquid electrolyte (particularly a room temperature ionic liquid), a gel electrolyte, or a combination thereof.

In the supercapacitor, at least one of the electrodes may further comprise a nano material selected from a carbon nano-tube, carbon nano-fiber, activated carbon, carbon black, nano-wire, metal oxide nano-wire or fiber, conductive polymer nano-fiber, or a combination thereof. In some embodiments (supercapacitors having pseudo-capacitance), at least one of the electrodes further comprises a material selected from the group consisting of $RuO_2$, $IrO_2$, NiO, $MnO_2$, $VO_x$, $TiO_2$, $Cr_2O_3$, $Co_2O_3$, $PbO_2$, $Ag_2O$, $MoC_x$, $Mo_2N$, $WC_x$, $WN_x$, a transition metal oxide, and combinations thereof. In some embodiments, at least one of the electrodes further comprises a conductive polymer that forms a redox pair with a graphene ligament.

In other embodiments, the graphene ligaments are functionalized. The graphene ligaments may be functionalized with one or more functional groups selected from the group consisting of —SO₃, —R'COX, —R'(COOH)₂, —CN, —R'CH₂X, —OH, —R'CHO, —R'CN, wherein R' is a hydrocarbon radical, and wherein X is —NH₂, —OH, or a halogen.

The inventive supercapacitor may contain an ionic liquid capable of operating up to at least 3.5 volts, preferably up to 4.5 volts. The supercapacitor can delivers an energy density of no less than 15 Wh/kg based on the total cell weight, often no less than 30 Wh/kg, and even no less than 500 Wh/kg based on the total cell weight of a symmetric EDLC. In contrast, commercially available EDLC supercapacitors typically have an energy density of 4-8 Wh/kg. Some of the invented supercapacitors (e.g. with redox or pseudocapacitance, or a lithium-ion capacitor) exhibit an energy density higher than 100 Wh/kg.

In some preferred embodiments, at least one of the electrodes in a supercapacitor is thicker than 200 μm (preferably >300 μm) and/or this electrode has an active material mass loading higher than 10 mg/cm² (preferably >15 mg/cm²). These are particularly significant based on the following considerations:

In a commercial supercapacitor having an electrode thickness of 150-200 μm, the weight of the active material (i.e. activated carbon) accounts for about 25%-30% of the total mass of the packaged cell. Hence, a factor of 3 to 4 is frequently used to extrapolate the energy or power densities of the device (cell) from the properties based on the active material weight alone (e.g. weight of activated carbon particles in commercial cells). In most of the scientific papers, the properties reported are typically based on the active material weight alone and the electrodes are typically very thin (<<100 μm, and mostly <<50 μm). In these cases, the active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial supercapacitors. Thus, one must be very careful when it comes to reading and interpreting the performance data of supercapacitors reported in the scientific papers and patent documents.

It is difficult to prepare a supercapacitor electrode thicker than 50 μm using isolated graphene sheets as the electrode active material in the traditional slurry coating process. Even with an excessively high amount of a binder resin (20% by weight of PVDF, for instance), electrodes thicker than 50 μm remain brittle and have a high tendency to get delaminated or cracked upon removal of the liquid medium (e.g. NMP) after coating. In other words, contrary to what one might be tempted to believe, the electrode thickness in a graphene-based supercapacitor is not a design parameter and one could not arbitrarily or freely choose to increase the electrode thickness for the purpose of increasing the active material mass loading and the energy density of a graphene sheet-based supercapacitor using the commonly practiced roll-to-roll coating of graphene-containing slurry.

In contrast, and quite surprisingly, the presently invented porous skeleton particles of 3D graphene ligaments, remaining of high structural integrity and of spherical or ellipsoidal shape, enable the formation of thick electrodes (200-400 μm) and, hence, exceptionally high active material mass loading (high areal density of active material). These thick electrodes are achieved without using a high amount of a binder resin (non-active material, not contributing to capacitance). In our electrodes, 5%-8% by weight of binder was found to be sufficient, in contrast to the 10-20% by weight of binder in prior art graphene-based supercapacitors made by the conventional slurry coating. These are truly remarkable and unexpected.

BRIEF DESCRIPTION OF THE DRAWINGS

FIG. 1A transmission electron microscopic (TEM) image of isolated graphene sheets, which are significantly re-stacked together.

DESCRIPTION OF THE PREFERRED EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic structure."

Petroleum- or coal-derived pitch is a mixture of polynuclear hydrocarbons with an average molecular weight of approximately 200 amu. Upon heating to approximately 200° C., pitch becomes fluid or gets melted. In the melt, the translational energy afforded to molecules by the temperature overcomes the cohesion energy. However, at a higher temperature (e.g., >300° C.), dehydrogenation polymerization reactions occur, causing average molecular weight to increase, which can reach 600-900 amu when the temperature is >400° C. As the molecules grow, the cohesive energy exceeds the translational energy, resulting in the homogeneous nucleation of a new phase, called the mesophase.

The polyaromatic molecules that constitute the mesophase pitch are discotic, with one axis much smaller than the other two axes. These molecules arrange themselves with the planes parallel to each other, forming nematic liquid crystals. The growing liquid crystal phase adopts a spherical shape to minimize surface energy. Thus, the mesophase creates microbeads, which could have diameters up to 100 μm.

In real practice, the micro bead-producing process begins with utilization of hydro-carbonaceous heavy oil such as petroleum heavy oil or petroleum pitch, coal tar pitch, or oil sand. When the pitch is carbonized by a heat treatment at 400° to 500° C., micro-crystals called mesophase microspheres are formed in the heat-treated pitch. These mesophase micro-spheres are liquid crystals having a characteristic molecular arrangement that can be converted into highly crystalline carbonized products by subjecting them to a further heat treatment. These mesophase micro-spheres (typically insoluble), after being isolated from other (soluble) components of the heat-treated pitch, can be used for a wide scope of applications having high added values, such as serving as starting materials for carbon fibers, binders, and adsorbents. Isolated mesophase micro-spheres are often referred to as meso-carbon microbeads (MCMB), mesophase carbon spheres (MCS), or carbonaceous microspheres (CMS).

Several methods have been used for isolation of such mesophase microspheres from other components in a pitch, including solvent extraction, emulsification, centrifugal separation, and pressurized filtration. Using solvent extraction as an example, the pitch matrix containing these microspheres may be first selectively dissolved in quinoline, pyridine, or an aromatic oil such as anthracene oil, solvent naptha, or the like, with the mesophase microspheres being suspended as an insoluble component. The insoluble component in the resulting suspension is then isolated by solid-liquid separation.

The isolated mesophase microspheres or MCMB may be subjected to further heat treatments at a temperature typically in the range of 500° C. to 3,200° C., more typically in the range of 1,000° C. to 3,000° C., and most typically in the range of 2,000° C. to 3,000° C. A higher temperature heat treatment, such as typically in the range of 2,000° C. to 3,000° C., serves to graphitize the MCMBs by increasing the lateral or a-directional dimension (La) and thickness-directional or c-directional dimension (Lc) of graphite crystallites. Graphitization also effectively increases the degree of crystallization or decreases the proportion of amorphous or defected portion of a MCMB. The diameter of commercially available MCMBs is typically between 1 μm and 100 μm, but more typically between 5 μm and 40 μm.

Our research group reported the results of producing isolated (separated) graphene sheets, also referred to as nano graphene platelets (NGPs), from MCMBs (Ref. 8). An NGP or graphene sheet is essentially composed of a sheet of graphene plane or multiple sheets of graphene plane stacked and bonded together. Each graphene plane, also referred to as a graphene sheet or basal plane, comprises a two-dimensional hexagonal structure of carbon atoms. Each platelet has a length and a width parallel to the graphene plane and a thickness orthogonal to the graphene plane. By definition, the thickness of an NGP is 100 nanometers (nm) or smaller, with a single-sheet NGP (single-layer graphene) being as thin as 0.34 nm.

Prior art NGPs are mostly produced from natural flake graphite particles. The length and width of a NGP produced from natural flake graphite are typically between 1 μm and 5 μm. For certain applications, both length and width of NGPs are preferably smaller than 1 μm. For instance, NGPs with shorter length and width can be more readily mixed with a polymer matrix to form a nanocomposite and the dispersion of such NGPs in the matrix is more uniform. We have surprisingly observed that, by starting with MCMBs heat-treated at a temperature of 350° C. to 1,400° C., we can readily obtain NGPs with length and width smaller than 100 nm (<0.1 μm), or even smaller than 10 nm.

In our earlier work (Ref. 8), we invented a process of producing separated nano graphene platelets (NGPs) having an average thickness no greater than 50 nm (typically less than 1 nm). The method comprises (a) intercalating a supply of meso-carbon microbeads (MCMBs) to produce intercalated MCMBs; and (b) exfoliating the intercalated MCMBs at a temperature and a pressure for a sufficient period of time to produce the desired isolated graphene sheets or NGPs.

As discussed in the Background section, isolated graphene sheets can be used as a supercapacitor electrode active material. However, conventional isolated graphene sheets, when used to form an electrode, suffer from several problems: high tendency to restack (hence, reduced specific surface area), poor packing density (low volumetric capacitance and low volumetric energy density), difficulty in producing electrodes thicker than 50 μm, low active material mass loading (when packed into an electrode), and inaccessibility of some graphene sheets by liquid electrolyte when graphene sheets are made into a layer of electrode using the conventional slurry coating or a paper-making process.

Presumably, one can mix isolated graphene sheets with a binder resin and then somehow find a way to make them into porous secondary particles that are each composed of graphene sheets bonded by a binder resin. This would be a tedious process, which does not have a good control over the size and shape of the resulting resin-bonded porous graphene particles. Although possible, such a process would involve very long, tedious, energy-intensive, environmentally non-benign, and expensive procedures, including chemical intercalation/oxidation of MCMBs or graphite particles, thermal exfoliation of these intercalated/oxidized particles, repeated rinsing of intercalated/oxidized particles (repeated 4-10 times) for removal of excess oxidizing/intercalating agents (sulfuric acids and potassium permanganate), mechanical isolation of graphene sheets from exfoliated graphite, re-constitution of graphene sheets and a binder resin. It may be noted that repeated rinsing steps are painstakingly slow, generating huge amounts of waste water which contains undesirable chemicals (such as manganese ions).

The present invention provides a process that completely obviates the need to go through such a tedious and problematic process to produce isolated graphene sheets first and then re-constitute them back into largely spherical secondary particles that are porous, having large amounts of electrolyte-accessible pores. This inventive process directly converts largely spherical MCMB particles into porous spherical or ellipsoidal particles wherein non-crystalline carbon ingredients have been removed to create pores, leaving behind a skeleton composed of a network of continuous or naturally interconnected graphene ligaments. These interconnected graphene ligaments typically have 1-20 graphene planes (mostly 3-15 graphene planes and further more typically 5-10 graphene planes) based on transmission electron microscopy (TEM) and X-ray diffraction studies. These graphene ligaments form a continuous network of electron-conducting paths without the presence of any binder resin. These graphene ligaments are highly conducting even though some of them contain some non-carbon elements, such as O and H, and the inter-graphene spacing is from 0.337 nm to 0.65 nm due to the presence of these non-carbon atoms (untreated MCMBs have an inter-graphene spacing of 0.335-0.336 nm). These porous skeleton particles can then be packed and bonded to form a supercapacitor electrode using the conventional slurry coating process.

In an embodiment, the present invention provides a process for producing a supercapacitor electrode containing porous spherical or ellipsoidal graphene-skeleton particles. The process comprises (a) subjecting multiple particles of meso-carbon micro-beads, MCMBs, to a chemical activation with an activating agent selected from an acid, a base, or a salt at an activation temperature from 100° C. to 1,200° C. for a period of 0.5 to 24 hours sufficient to produce multiple porous particles each of a monolithic 3D graphene structure comprising multiple pores having a pore size in the range of 1 nm and 50 nm and a continuous 3D network of graphene pore walls comprising continuous or naturally interconnected graphene ligaments of from 1 to 20 graphene planes of carbon atoms; (b) producing a suspension containing these multiple porous particles, an optional conductive additive, and an optional resin binder (e.g. PVDF) in a liquid medium (e.g. NMP); and (c) depositing the suspension onto at least a primary surface (preferably both opposed primary surfaces) of a current collector to form a wet layer and removing the liquid medium from the wet layer to form the supercapacitor electrode.

The activating agent may be preferably selected from $H_3PO_4$, $H_2SO_4$, $ZnCl_2$, NaOH, KOH, $CaCl_2$, $CH_3CO_2K$ (potassium acetate), or a combination thereof. It may be noted that $H_2SO_4$ alone (without an oxidizer such as potassium permanganate or hydrogen peroxide) is not an effective oxidizing/intercalating agent for producing intercalated/oxidized graphite or MCMBs as a precursor to exfoliated graphite and isolated graphene sheets. The $H_2SO_4$ alone, without mixing with other species (such as $H_3PO_4$), is not a very effective activating agent either.

The chemical activation can be conducted in combination with physical activation. The chemical activation may be conducted before, during (concurrently with), and after a physical activation. The physical activation of a starting material (e.g. MCMBs) is conducted using hot gases (steam, $O_2$, or $CO_2$, for instance). Specifically, a raw material (meso-phase spheres) or carbonized material (e.g. MCMBs) is exposed to oxidizing atmospheres (oxygen or steam) at temperatures above 250° C., usually in the temperature range of 600-1200° C. Air is then introduced to burn out the gasses, creating a graded, screened and de-dusted form of activated MCMBs.

Figure 2:
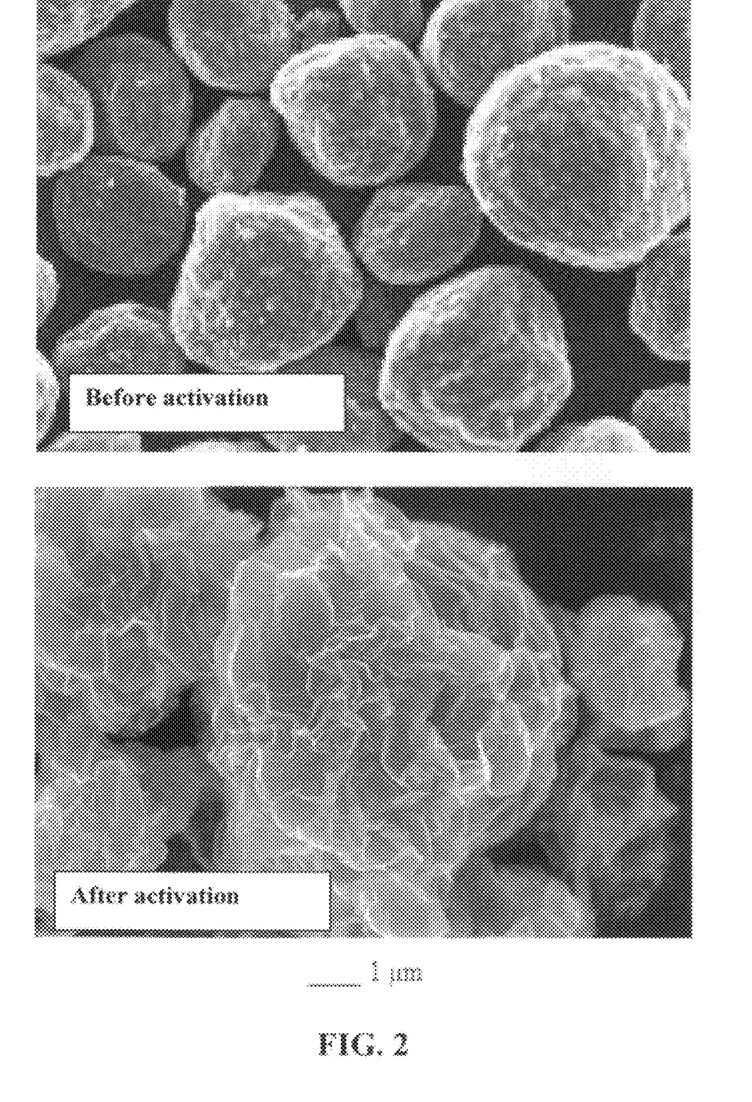
FIG. 2 Scanning electron microscopic (SEM) images of MCMBs before activation (top image) and after heavy activation (bottom image), exposing skeletons of interconnected 3D graphene ligaments.

For chemical activation, the raw material is impregnated with certain chemicals. The chemical is typically an acid, strong base, or a salt (phosphoric acid, potassium hydroxide, sodium hydroxide, calcium chloride, and zinc chloride). Then, the raw material is heat-treated at temperatures from 300° C.-1200° C. (more typically 450-900° C.). For "greener" MCMBs (non- or less carbonized meso phase spheres), both carbonization and activation proceed simultaneously. For well-carbonized or graphitized MCMBs, the chemical activation agent preferentially permeates and etches away the amorphous or less ordered portion of the MCMB particles, thereby generating pores. If done properly, as illustrated in FIG. 2, each of the chemically activated MCMBs becomes essentially a 3D graphene skeleton composed of graphene ligaments (backbone) that are continuous or naturally interconnected throughout the entire spherical shape of the original MCMB particle. These chemically activated MCMBs maintain the original spherical shape, but with the internal skeleton of graphene ligaments being exposed. These graphene ligaments usually do not have clearly defined terminal ends. This is in contrast to those isolated graphene sheets obtained by exfoliating graphite and mechanically breaking the exfoliated graphite into separate, free-standing sheets. Topologically, these isolated graphene sheets (e.g. rectangular shape) have four edges/sides or terminal ends.

For the purpose of defining the geometry of a conventional isolated graphene sheet or NGP, the NGP is described as having a length (the largest dimension), a width (the second largest dimension), and a thickness. The thickness is the smallest dimension, which is no greater than 100 nm and, in the present application, no greater than 10 nm (preferably no greater than 2 nm, more preferably no greater than 1 nm, and most preferably no greater than 0.4 nm, or single-layer graphene only).

Figure 1:
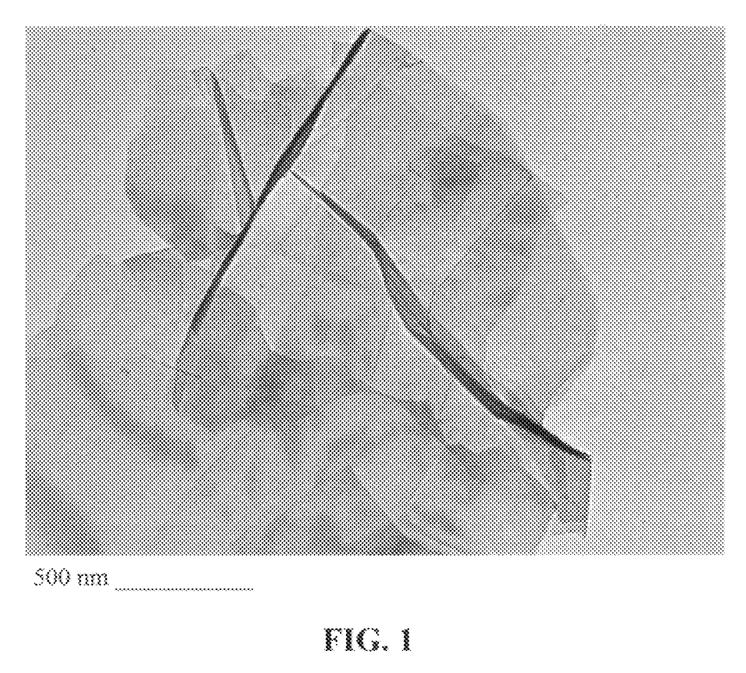

Despite the fact that individual (isolated) graphene sheets have an exceptionally high specific surface area, flat-shaped graphene sheets prepared by conventional routes have a great tendency to re-stack together or overlap with one another, thereby dramatically reducing the specific surface area that is accessible by the electrolyte. This phenomenon is illustrated in FIG. 1, wherein several single-layer graphene sheets overlap and re-stack tightly. There is no discernable gap or pore between two graphene sheets that are overlapped together. Due to this re-stacking tendency, a mass of supposedly single-layer graphene sheets typically exhibits a specific surface area of 400-700 $m^2/g$, contrary to the theoretical value of 2,675 $m^2/g$. In open literature or patent documents, one hardly could find any sample mass of graphene sheets that has a measured surface area higher than 1,000 $m^2/g$.

We were surprised to observe that presently invented particles of chemically activated MCMBs exhibit a specific surface area typically in the range of 1,200-3,200 $m^2/g$, more typically from 1,500 to 2,800 $m^2/g$, and most typically from 2,000 to 2,800 $m^2/g$. Furthermore, no matter how you compress (compact) a mass of multiple particles of these chemically activated MCMBs, the resulting compacted mass substantially maintains its specific surface area (still typically in the range of 1,200-3,200 $m^2/g$, and more typically from 1,500 to 2,800 $m^2/g$). In contrast, when compressed or made into an electrode, the mass of presumably single-layer, isolated graphene sheets typically would find its specific surface area dramatically reduced (e.g. from 700 $m^2/g$ down to less than 100 $m^2/g$). Clearly, for practical supercapacitor applications, the presently invented skeletons of graphene ligaments are significantly preferred to those isolated graphene sheets.

The chemically activated MCMBs typically show a pore size in the range of 1-50 nm, and more typically a mesoporous structure having a desired pore size range (e.g. 2-25 nm, mostly 4-15 nm) when they were stacked together to form an electrode. Further surprisingly, this size range appears to be conducive to being accessible by an ionic liquid, which is significantly larger in size than other types of electrolyte molecules (e.g., KOH in an aqueous electrolyte). The meso pores constituted by the presently invented graphene ligaments also appear to be capable of forming electric double layer charges therein, leading to an exceptionally high specific capacitance. Based on open literature data, the specific capacitance of isolated graphene sheet-based EDLC supercapacitors is typically in the range of 90-160 F/g, but that of the presently invented porous particles of graphene skeleton in the range of 150-250 F/g. These differences are huge and quite unexpected.

Another significant and previously unattainable advantage is the notion that these interconnected graphene ligaments lead to porous 3-D graphene particles that are orders-of-magnitude more conductive than a mass of previously isolated graphene sheets that are re-shaped together (with the help of a binder resin) into secondary particles. When these particles are made into an electrode, the electrical conductivity values are $5 \times 10^{-3}$–$6 \times 10^0$ S/cm (inventive electrode) vs. $2 \times 10^{-5}$–$3 \times 10^{-3}$ S/cm (conventional electrode containing resin-bonded graphene sheets). The lower internal resistance of the instant 3D graphene skeletons leads to a significantly higher power density of a supercapacitor.

Further, we were also surprised to observe that the graphene skeleton-based electrode appears to be highly compatible with ionic liquid electrolyte, enabling the ionic liquid to be operated at an exceptionally high voltage, V (V typically >3.5 volts and often >4.5 volts). A larger working voltage implies a much higher specific energy density according to $E=\frac{1}{2}C_{cell}V^2$, where $C_{cell}$=specific capacitance of the cell.

Hence, one preferred embodiment of the present invention is a supercapacitor comprising a first electrode, a second electrode, a porous separator disposed between the first and the second electrode, and an ionic liquid electrolyte in physical contact with the two electrodes, wherein at least one of the two electrodes comprises multiple porous particles of interconnected 3D graphene ligaments produced by the presently invented process. Preferably, the monolithic 3D graphene structure comprises multiple pores having a pore size in the range from 1 nm to 50 nm and a continuous 3D network of graphene pore walls comprising continuous or naturally interconnected graphene ligaments of 1 to 20 graphene planes of carbon atoms.

Each porous particle comprises a monolithic 3D graphene structure comprising multiple pores having a pore size preferably in the range of 2 nm and 25 nm and a continuous 3D network of graphene pore walls comprising naturally interconnected graphene ligaments of from 1 to 20 graphene planes of carbon atoms without using a binder. This continuous or naturally interconnected 3D network of graphene ligaments is not made from re-connecting previously separated graphene sheets, graphene oxide sheets, or chemically modified graphene sheets, or from chemical vapor deposition. Preferably, the multiple pores have a pore size in the range of 3 nm and 25 nm, more preferably in the range of 4 nm and 15 nm.

In a preferred embodiment, both of the first electrode and the second electrode of a supercapacitor are produced by the above-described process. The electrolyte used in the presently invented supercapacitor can be an aqueous liquid electrolyte, an organic liquid electrolyte, an ionic liquid electrolyte (particularly a room temperature ionic liquid), a gel electrolyte, or a combination thereof.

In the supercapacitor, at least one of the electrodes may further comprise a nano material selected from a carbon nano-tube, carbon nano-fiber, activated carbon, carbon black, nano-wire, metal oxide nano-wire or fiber, conductive polymer nano-fiber, or a combination thereof. The nano fibrils may be mixed with the porous graphene particles, along with a resin binder, to make an electrode.

In some embodiments (supercapacitors having pseudo-capacitance), at least one of the electrodes further comprises a material selected from the group consisting of $RuO_2$, $IrO_2$, $NiO$, $MnO_2$, $VO_x$, $TiO_2$, $Cr_2O_3$, $Co_2O_3$, $PbO_2$, $Ag_2O$, $MoC_x$, $Mo_2N$, $WC_x$, $WN_x$, a transition metal oxide, and combinations thereof. In some embodiments, at least one of the electrodes further comprises a conductive polymer that forms a redox pair with a graphene ligament.

In other embodiments, the graphene ligaments are functionalized. The graphene ligaments may be functionalized with one or more functional groups selected from the group consisting of —$SO_3$, —R'COX, —R'(COOH)$_2$, —CN, —R'CH$_2$X, —OH, —R'CHO, —R'CN, wherein R' is a hydrocarbon radical, and wherein X is —NH$_2$, —OH, or a halogen.

The inventive supercapacitor may contain an ionic liquid capable of operating up to at least 3.5 volts, preferably up to 4.5 volts. The supercapacitor can delivers an energy density of no less than 30 Wh/kg based on the total cell weight, often no less than 50 Wh/kg, and even no less than 100 Wh/kg based on the total cell weight. In contrast, commercially available EDLC supercapacitors typically have an energy density of 4-8 Wh/kg.

The 3D skeletons of interconnected graphene ligaments used in the aforementioned electrode may be subjected to the following treatments, separately or in combination, before or after the electrode fabrication operation:
  (a) chemically functionalized;
  (b) coated or grafted with a conductive polymer;
  (c) deposition with transition metal oxides or sulfides, such as $RuO_2$, $TiO_2$, $MnO_2$, $Cr_2O_3$, and $Co_2O_3$, for the purpose of imparting pseudo-capacitance to the electrode (not as a spacer);
  (d) exposure to nitric acid, fluorine, or ammonia plasma.

Conducting polymers, such as polyacetylene, polypyrrole, polyaniline, polythiophene, and their derivatives, are good choices for use to form a redox pair with graphene ligaments in the present invention. These treatments are intended for further increasing the capacitance value through pseudo-capacitance effects such as redox reactions. Alternatively, transition metal oxides or sulfides such as $RuO_2$, $TiO_2$, $MnO_2$, $Cr_2O_3$, and $Co_2O_3$ can be deposited onto the NGP surface for pseudo-capacitance. Other useful surface functional groups may include quinone, hydroquinone, quaternized aromatic amines, mercaptans, or disulfides.

The following examples serve to illustrate the preferred embodiments of the present invention and should not be construed as limiting the scope of the invention:

Example 1: Chemical Activation of MCMBs by $ZnCl_2$

We used two different amounts of starting material (400 g and 100 g). Other than this difference in starting amounts, all other variables were the same in the following activation procedures. The particles were impregnated with zinc chloride ($ZnCl_2$) at 1:1 wt. ratio and were kept at 80° C. for 14 h. Heat treatments were then carried out under constant nitrogen flow (5 l/h). The heat treatment temperature was raised at 4° C./min up to 500° C., which was maintained for 3 h. The samples were then washed to remove excess reagent and dried at 110° C. for about 3 h. The resulting samples were labeled as CA (chemically activated only). Part of these samples was then also submitted to physical activation. Temperature was raised to 900° C. at a rate of 25° C./min, under nitrogen flow. At 900° C., the samples were then contacted with steam (0.8 kg/h) for 30 min. These samples were then labeled as CAPA (both chemically and physically activated). It was observed that combined physical and chemical activation treatments led to a higher porosity level and slightly higher pore sizes that are more readily accessible to liquid electrolyte.

Example 2: Chemical Activation of MCMBs by KOH, NaOH, and Their Mixtures

In this example, several MCMB samples were separately mixed with KOH, NaOH, and their mixtures (30/70, 50/50, and 70/30 weight ratios) to obtain reactant blends. The blends were then heated to a desired temperature (in the range of 700-950° C.) and maintained at this temperature for 0.5-12 hours to produce various activated MCMB samples. The resulting structures vary with the previous heat treatment history of MCMBs, activation temperature, and activation time. The following observations were made:

1) The maximum heat treatment temperature ($T_{max}$) the MCMBs saw prior to the chemical activation dictates the number of graphene planes in graphene ligaments and the maximum porosity level of the resulting porous particles. A $T_{max}$ in the range of 500-1,500° C. tends to result in thinner ligaments (1-3 graphene planes); $T_{max}$ of 1,500-2,500° C. leads to 3-7 graphene planes; and $T_{max}$ of 2,500-3,000° C. leads to 7-20 graphene planes. A higher $T_{max}$ for a longer period of heat treatment time leads to a higher degree of graphitization of MCMBs and progressively smaller amount of amorphous zones left in the MCMB.

2) Given the same MCMBs, a higher activation temperature and longer activation time lead to a higher porosity level, but the number of graphene planes in graphene ligaments appears to be relatively independent of the activation time and temperature.

3) An excessively long activation time (e.g. >3 hours) would consume too much carbon material, reducing the production yield of the 3D graphene skeleton particles.

The electrodes were made of 3D graphene skeleton particles, mixed with 5 wt % Super-P® and 7 wt % polytetrafluoroethylene (PTFE) binder. The procedure of slurry coating on Al foil was conducted to produce electrodes having a thickness from 50 μm to 400 μm.

Example 4: Oxidation, Exfoliation, and Graphene Sheet Separation of Natural Graphite to Produce Graphene Oxide (GO) Sheets and Production of Pristine Graphene Sheets In order to prepare supercapacitor electrodes using conventional slurry coating of previously isolated graphene sheets, we proceeded to produce isolated graphene sheets (including graphene oxide and pristine graphene) using two different methods: the modified Hummers method and the liquid phase exfoliation (direct ultrasonication) method, respectively.

Graphite oxide was prepared by oxidation of natural flake graphite with sulfuric acid, sodium nitrate, and potassium permanganate at a ratio of 4:1:0.05 at 30° C. for 24 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 5. The intent was to remove all sulfuric and nitric acid residue outside of graphite interstices. The slurry was then dried and stored in a vacuum oven at 60° C. for 24 hours.

The dried, intercalated (oxidized) compound was placed in a quartz tube that was inserted into a horizontal tube furnace pre-set at 1,050° C. to effect exfoliation for 1 minute. The resulting exfoliated graphite was dispersed in NMP and subjected to ultrasonication for 30 minutes to obtain a nano graphene oxide suspension. Then, 5% of a conductive additive (Super-P) and 15% of PTFE binder resin were added into this suspension to form a slurry. The slurry was coated to both primary surfaces of an Al foil-based current collector and dried to form supercapacitor electrodes.

Pristine graphene sheets were produced by the direct ultrasonication technique (Ref 8). In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. Pristine graphene is essentially free from any non-carbon elements. Pristine graphene sheets were then incorporated in a supercapacitor using the conventional procedure of slurry coating, drying and layer laminating. Three types of supercapacitors, including EDLC, pseudo-capacitance types, and lithium-ion capacitors, were investigated. A lithium-ion capacitor contains a prelithiated graphite anode and a graphene cathode layer.

Supercapacitor cells were assembled in a glove box. A supercapacitor unit cell comprises two electrodes that were electrically isolated from each other by a Celguard-3501 porous membrane. The ionic liquid electrolyte was 1-ethyl-3-methylimidazolium tetrafluoroborate ($EMIMBF_4$).

Example 5: Evaluation of Various Supercapacitor Cells

In most of the examples investigated, both the inventive supercapacitor cells containing 3D graphene ligament-based active material particles and their conventional counterparts (isolated graphene sheet-based) were fabricated and evaluated. The latter cells, for comparison purposes, were prepared by the conventional procedures of slurry coating of isolated graphene sheets (along with a conductive additive and a binder resin), drying of electrodes, assembling of anode layer, separator, and cathode layer, packaging of assembled laminate, and injection of liquid electrolyte. In a conventional cell, an electrode (cathode or anode), is typically composed of 75-90% an electrode active material, 5%

Super-P (acetylene black-based conductive additive), and 5-20% PTFE (5-8% for the electrodes of activated MCMBs and 10-20% for isolated graphene sheet-based), which were mixed and coated on Al foil. The capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

Galvanostatic charge/discharge tests were conducted on the samples to evaluate the electrochemical performance. For the galvanostatic tests, the specific capacity (q) is calculated as $$q=I*t/m \quad (1)$$

where I is the constant current in mA, t is the time in hours, and m is the cathode active material mass in grams. With voltage V, the specific energy (E) is calculated as, $$E=\int Vdq \quad (2)$$

The specific power (P) can be calculated as $$P=(E/t)(W/kg) \quad (3)$$

where t is the total charge or discharge step time in hours. The specific capacitance (C) of the cell is represented by the slope at each point of the voltage vs. specific capacity plot, $$C=dq/dV \quad (4)$$

For each sample, several current densities (representing charge/discharge rates) were imposed to determine the electrochemical responses, allowing for calculations of energy density and power density values required of the construction of a Ragone plot (power density vs. energy density).

Figure 3:
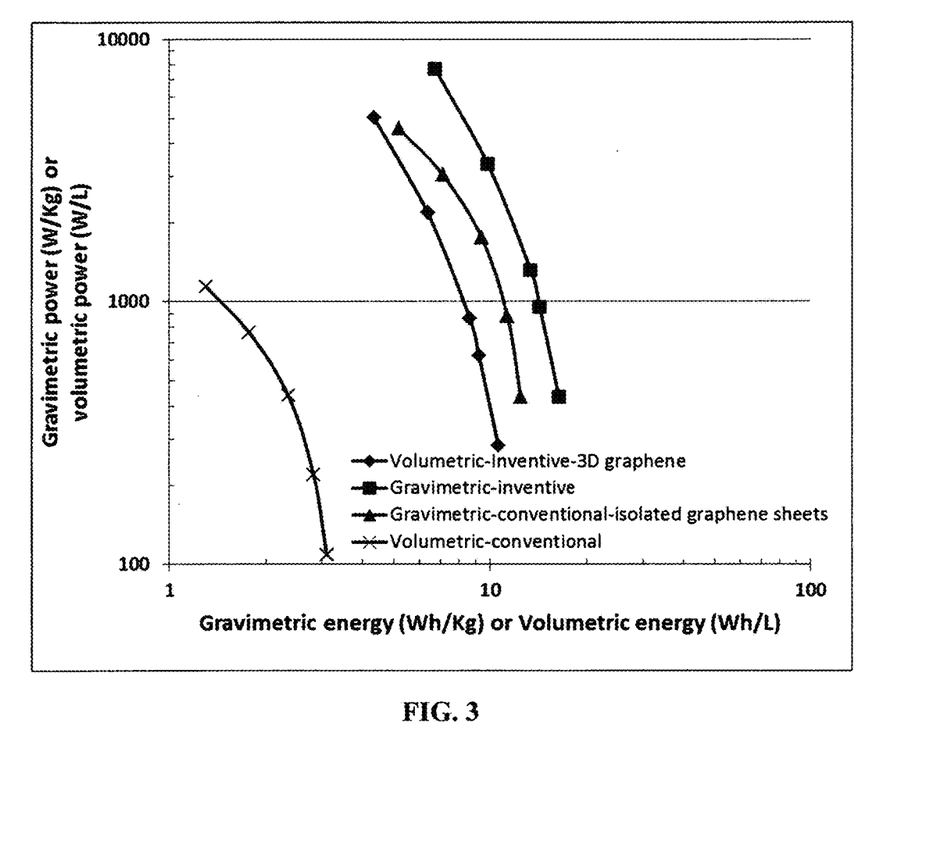
FIG. 3 Ragone plots (both gravimetric and volumetric energy densities vs. corresponding gravimetric and volumetric power densities) of representative supercapacitor cells (symmetric EDLCs) containing continuous 3D graphene ligament-based electrodes and isolated graphene sheet-based electrodes, respectively.

Example 6: Chemically Activated MCMBs vs. Isolated Graphene Sheet-Based Supercapacitors The Ragone plots (both gravimetric and volumetric energy densities vs. corresponding gravimetric and volumetric power densities) of representative supercapacitor cells (symmetric EDLCs) containing continuous 3D graphene ligament-based electrode and isolated graphene sheet-based electrodes, respectively, are shown in FIG. 3. Several significant observations can be made from these data:
- (A) Both the gravimetric and volumetric energy densities and power densities of the supercapacitor cells containing continuous 3D graphene ligaments prepared by the presently invented chemical activation method as the electrode active material (denoted as "inventive" in the figure legend) are significantly higher than those of their counterparts containing previously isolated graphene sheets as the electrode active material (denoted as "conventional"). The differences are quite significant and are mainly due to the high active material mass loading (>12 mg/cm$^2$ vs. <5 mg/cm$^2$) associated with the presently invented cells, no graphene restacking issue, reduced proportion of binder resin, and the ability of the inventive method to more effectively pack spherical particles together to form thicker electrodes of good structural integrity.
- (B) For the cells prepared by the conventional method, the absolute magnitudes of the volumetric energy densities and volumetric power densities are significantly lower than those of their gravimetric energy densities and gravimetric power densities, due to the very low tap density (packing density of 0.25 g/cm$^3$) of GO-based electrodes prepared by the conventional slurry coating method.
- (C) In contrast, for the cells prepared by the presently invented method, the absolute magnitudes of the volumetric energy densities and volumetric power densities are higher than those of their gravimetric energy densities and gravimetric power densities, due to the relatively high tap density (packing density of 0.65 g/cm$^3$) of chemically activated MCMBs.

Example 7: Chemically Activated MCMBs Vs. Conventional Activated Carbon

Figure 4:
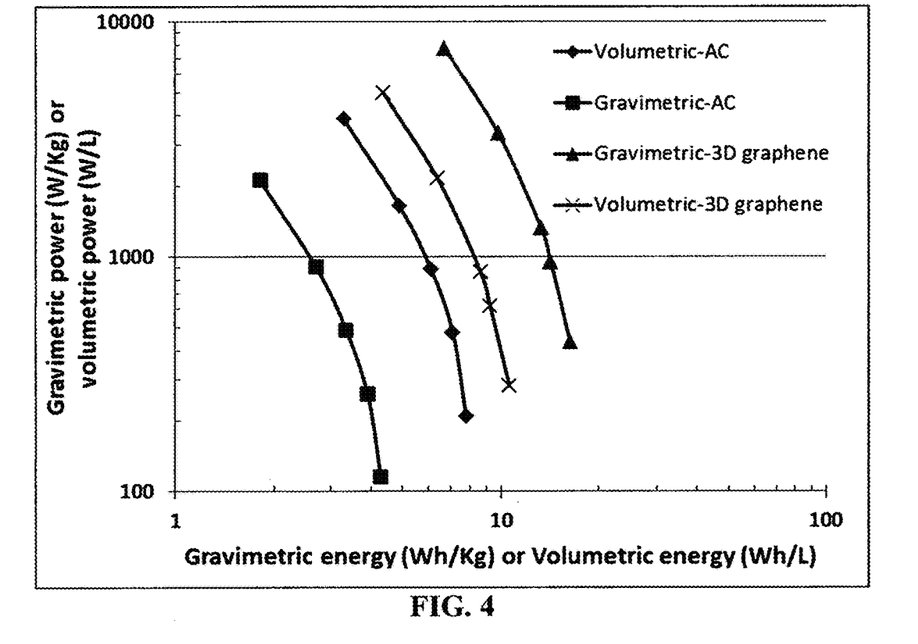
FIG. 4 Ragone plots (both gravimetric and volumetric energy densities vs. corresponding gravimetric and volumetric power densities) of representative supercapacitor cells (symmetric EDLCs) containing continuous 3D graphene ligament-based eletrodes and conventional activated carbon-based electrodes, respectively.

Summarized in FIG. 4 are the Ragone plots (both gravimetric and volumetric energy densities vs. corresponding gravimetric and volumetric power densities) of representative supercapacitor cells (symmetric EDLCs) containing continuous 3D graphene ligament-based and conventional activated carbon-based electrodes, respectively. The activated carbon particles were prepared from concurrent carbonization and chemical activation of coconut shells. The coconut shells were significantly more irregular in shape than spherical MCMBs. Furthermore, we have discovered that chemical etching of MCMBs produces very small (negligible) amount of microscopic pores (<1 nm), majority being meso-porous (having a size from 2 nm to 25 nm). In contrast, typically 40-70% of the pores in conventional activated carbons are less than 1 nm in size, which are inaccessible to liquid electrolyte.

Example 8: Lithium-Ion Capacitors (LICs)

Figure 5:
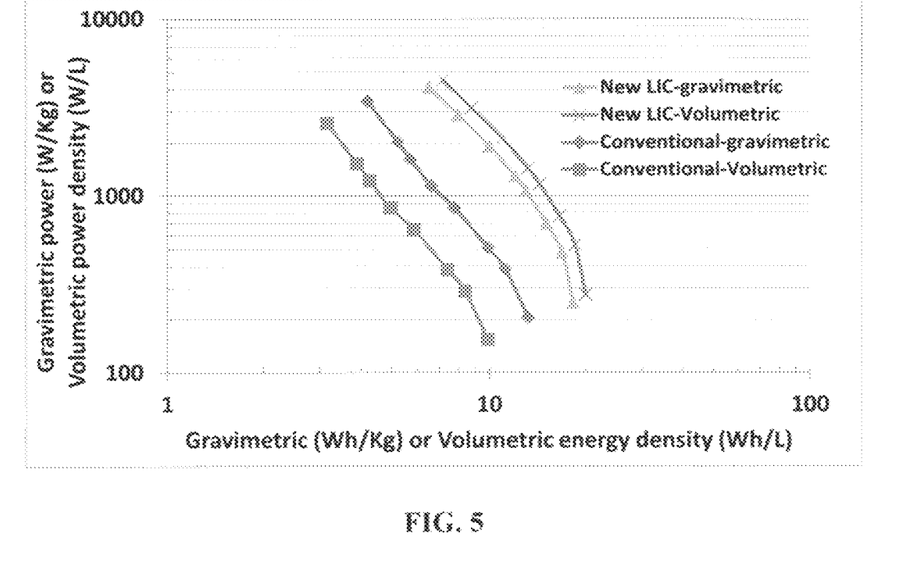
FIG. 5 Ragone plots (both gravimetric and volumetric energy densities vs. corresponding gravimetric and volumetric power densities) of representative lithium-ion capacitor cells (having a prelithiated graphite anode) containing a continuous 3D graphene ligament-based cathode and a conventional isolated graphene sheet-based cathode, respectively.

Shown in FIG. 5 are the Ragone plots (both gravimetric and volumetric energy densities vs. corresponding gravimetric and volumetric power densities) of representative lithium-ion capacitor cells (prelithiated graphite anode) containing continuous 3D graphene ligament-based cathode and conventional isolated graphene sheet-based cathode, respectively.

These lithium ion capacitor (LIC) cells contain lithium salt (LiPF$_6$)-PC/DEC as organic liquid electrolyte. These data indicate that both the gravimetric and volumetric energy densities and power densities of the LIC cells containing the continuous 3D graphene ligament particles are significantly higher than those of their counterparts containing isolated graphene sheets (pristine graphene).

For the LIC cells containing an isolated graphene sheet cathode, the absolute magnitudes of the volumetric energy densities and volumetric power densities are significantly lower than those of their gravimetric energy densities and gravimetric power densities, due to the very low tap density (packing density of 0.25 g/cm$^3$) of pristine graphene-based cathodes prepared by the conventional slurry coating method. In contrast, for the LIC cells containing 3D graphene ligaments, the absolute magnitudes of the volumetric energy densities and volumetric power densities are higher than those of their gravimetric energy densities and gravimetric power densities, due to the relatively high tap density of continuous 3D graphene ligament-based cathodes prepared by the presently invented method.

It is of significance to point out that reporting the energy and power densities per weight of active material alone on a Ragone plot, as did by many researchers, may not give a realistic picture of the performance of the assembled supercapacitor cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional isolated graphene sheets in slurry coating processes. The present invention overcomes this long-standing, most serious problem in the art of supercapacitors.

Example 8: 3D Graphene Ligaments Further Treated with Poly(3-Methyl-Thiophene), as an Example of Pseudocapacitor or Redox Supercapacitor Electronically conductive polymers by themselves are promising supercapacitor electrode materials because the charge process involves the entire polymer mass and they provide low equivalent series resistance for the electrode. When combined with a graphene-type substrate material, the conducting polymer can impart pseudo-capacitance to the electrode. One desirable conductive polymer selected was poly(3-methyl-thiophene) (pMeT), particularly its p-doped variant. Poly(3-methyl-thiophene) could be synthesized by oxidative chemical polymerization technique using ferric chloride as a dopant in an inert atmosphere. However, we chose to prepare PMeT doped with different anions electrochemically in the presence of tetra-alkyl-ammonium salts using various chemically activated MCMB particles as an electrode.

The specific capacitance of an electrode formed of 3D ligaments and a 3D ligament-pMeT redox pair were found to be 186 F/g, and 357 F/g, respectively, when measured at a current density of 1 A/g. Their isolated graphene sheets counterparts exhibit a specific capacitance of 146 F/g and 279 F/g, respectively. These data have clearly demonstrated that the presently invented chemically activated MCMB particles are surprisingly more effective than their isolated graphene sheet counterparts in storing charges. Other redox pair partner materials (e.g. transition metal oxide, $MnO_2$ and other conductive polymer) can be incorporated into the porous 3D graphene structure to make a pseudo-capacitor electrode in a similar manner.

We claim:

1. A process for producing a supercapacitor electrode, said process comprising (a) subjecting multiple particles of meso-carbon micro-beads, MCMBs, to a chemical activation with an activating agent selected from an acid, a base, or a salt at an activation temperature from 100° C. to 1,200° C. for a period of 0.5 to 24 hours sufficient to produce multiple porous particles, wherein said MCMBs include carbonized or graphitized MCMBs that have been previously heat-treated at a temperature from 500° C. to 3,200° C.; (b) producing a suspension containing said multiple porous particles, an optional conductive additive, and an optional resin binder in a liquid medium; and (c) depositing said suspension onto at least a primary surface of a current collector to form a wet layer and removing said liquid medium from said wet layer to form said supercapacitor electrode, which is composed of said multiple porous particles each of a monolithic 3D graphene structure comprising multiple pores having a pore size in the range of 1 nm and 50 nm and a continuous 3D network of graphene pore walls comprising continuous or naturally interconnected graphene ligaments of from 1 to 20 graphene planes of carbon atoms.

2. The process of claim 1, wherein said activating agent is selected from $H_3PO_4$, $H_2SO_4$, $ZnCl_2$, NaOH, KOH, $CaCl_2$, $CH_3CO_2K$ (potassium acetate), or a combination thereof.

3. The process of claim 1, wherein said chemical activation is conducted before, during, and after a physical activation.

4. The process of claim 1, wherein said activation temperature is from 300° C. to 1,000° C.

5. The process of claim 1, wherein said multiple porous particles are substantially spherical or ellipsoidal in shape.

6. The process of claim 1, wherein said multiple pores have a pore size in the range of 2 nm and 25 nm.

7. The process of claim 1, wherein said graphene ligaments contain an amount of non-carbon elements so that the inter-graphene spacing is increased from an inter-graphene spacing of 0.336 nm, for MCMBs prior to chemical activation, to a range of from 0.337 nm to 0.65 nm.

8. The process of claim 1, wherein said graphene ligaments are further deposited with a redox pair partner material selected from an organic or conducting polymer and/or a transition metal oxide.

9. The process of claim 1, wherein said graphene ligaments are further deposited with a redox pair partner material selected from $RuO_2$, $IrO_2$, NiO, $MnO_2$, $VO_x$, $TiO_2$, $Cr_2O_3$, $Co_2O_3$, $PbO_2$, $Ag_2O$, $MoC_x$, $Mo_2N$, $WC_x$, $WN_x$, and combinations thereof.

10. The process of claim 1 wherein said graphene ligaments are further functionalized with one or more functional groups selected from the group consisting of —$SO_3$, —R'COX, —R'$(COOH)_2$, —CN, —R'$CH_2$X, —OH, —R'CHO, —R'CN, wherein R' is a hydrocarbon radical, and wherein X is —$NH_2$, —OH, or a halogen.

11. The process of claim 1 wherein said graphene ligaments are further deposited with an intrinsically conductive polymer to form a redox pair for inducing pseudocapacitance.

12. A supercapacitor comprising a first electrode, a second electrode, a porous separator disposed between the first and the second electrode, and an electrolyte in physical contact with the first and second electrodes, wherein at least one of the two electrodes is prepared by the process of claim 1, wherein said at least one electrode contains multiple porous particles each of a monolithic 3D graphene structure comprising multiple pores having a pore size in the range from 1 nm to 50 nm and a continuous 3D network of graphene pore walls comprising continuous or naturally interconnected graphene ligaments of 1 to 20 graphene planes of carbon atoms.

13. The supercapacitor of claim 12, wherein the electrolyte is an aqueous liquid electrolyte, an organic liquid electrolyte, an ionic liquid electrolyte, a gel electrolyte, or a combination thereof.

14. The supercapacitor of claim 12 wherein said multiple pores have a pore size in the range of 3 nm and 25 nm.

15. The supercapacitor of claim 12 wherein said multiple pores have a pore size in the range of 4 nm and 15 nm.

16. The supercapacitor of claim 12 wherein both of the first electrode and the second electrode are produced by the process of claim 1.

17. The supercapacitor of claim 12 wherein said electrolyte contains a room temperature ionic liquid.

18. The supercapacitor of claim 12 wherein said at least one of the electrodes further comprises a nano material selected from a carbon nano-tube, carbon nano-fiber, activated carbon, carbon black, nano-wire, metal oxide nano-wire or fiber, conductive polymer nano-fiber, or a combination thereof.

19. The supercapacitor of claim 12 wherein at least one of the electrodes further comprises a material selected from the group consisting of $RuO_2$, $IrO_2$, NiO, $MnO_2$, $VO_x$, $TiO_2$, $Cr_2O_3$, $Co_2O_3$, $PbO_2$, $Ag_2O$, $MoC_x$, $Mo_2N$, $WC_x$, $WN_x$, a transition metal oxide, and combinations thereof.

20. The supercapacitor of claim 12 wherein said at least one of the electrodes further comprises a conductive polymer that forms a redox pair with a graphene ligament.

21. The supercapacitor of claim 12 wherein said graphene ligaments are functionalized.

22. The supercapacitor of claim 12 wherein said nano graphene ligaments are functionalized with one or more functional groups selected from the group consisting of —$SO_3$, —R'COX, —R'(COOH)$_2$, —CN, —R'CH$_2$X, —OH, —R'CHO, —R'CN, wherein R' is a hydrocarbon radical, and wherein X is —NH$_2$, —OH, or a halogen.

23. The supercapacitor of claim 12, wherein said at least one of the electrodes is thicker than 200 μm and/or has an active material mass loading higher than 10 mg/cm$^2$.

24. The supercapacitor of claim 12 wherein said supercapacitor provides an energy density of no less than 30 Wh/kg based on the total cell weight.

25. The supercapacitor of claim 12 wherein said supercapacitor provides an energy density of no less than 50 Wh/kg based on the total cell weight.

26. The supercapacitor of claim 12 wherein said supercapacitor provides an energy density of no less than 100 Wh/kg based on the total cell weight.

27. The supercapacitor of claim 12 wherein said ionic liquid is operated up to at least 3.5 volts.

28. The supercapacitor of claim 12 wherein said ionic liquid is operated up to at least 4.5 volts.

29. A process for producing a supercapacitor electrode, said process comprising (a) subjecting multiple particles of meso-carbon micro-beads, MCMBs, to a chemical activation with an activating agent selected from an acid, a base, or a salt at an activation temperature from 100° C. to 1,200° C. for a period of 0.5 to 24 hours sufficient to produce multiple porous particles, wherein said salt is selected from $ZnCl_2$, $CaCl_2$, $CH_3CO_2K$ (potassium acetate), a combination thereof, or a combination thereof with NaOH, KOH, or both; (b) producing a suspension containing said multiple porous particles, an optional conductive additive, and an optional resin binder in a liquid medium; and (c) depositing said suspension onto at least a primary surface of a current collector to form a wet layer and removing said liquid medium from said wet layer to form said supercapacitor electrode, which is composed of said multiple porous particles each of a monolithic 3D graphene structure comprising multiple pores having a pore size in the range of 1 nm and 50 nm and a continuous 3D network of graphene pore walls comprising continuous or naturally interconnected graphene ligaments of from 1 to 20 graphene planes of carbon atoms.

* * * * *